US012474731B2

(12) United States Patent
Vercoelen et al.

(10) Patent No.: US 12,474,731 B2
(45) Date of Patent: Nov. 18, 2025

(54) SELF-GOVERNING SYNCHRONIZATION SYSTEM AND METHOD

(71) Applicant: MANUS TECHNOLOGY GROUP B.V., Geldrop (NL)

(72) Inventors: Paul Vercoelen, Geldrop (NL); André Van Schoubroeck, Geldrop (NL)

(73) Assignee: MANUS TECHNOLOGY GROUP B.V., Geldrop (NL)

( * ) Notice: Subject to any disclaimer, the term of this patent is extended or adjusted under 35 U.S.C. 154(b) by 78 days.

(21) Appl. No.: 18/690,432

(22) PCT Filed: Sep. 8, 2022

(86) PCT No.: PCT/IB2022/058472
§ 371 (c)(1),
(2) Date: Mar. 8, 2024

(87) PCT Pub. No.: WO2023/037289
PCT Pub. Date: Mar. 16, 2023

(65) Prior Publication Data
US 2024/0427373 A1 Dec. 26, 2024

Related U.S. Application Data

(60) Provisional application No. 63/242,502, filed on Sep. 10, 2021.

(51) Int. Cl.
*G06F 1/12* (2006.01)
*G06F 1/16* (2006.01)
*G06F 3/01* (2006.01)

(52) U.S. Cl.
CPC .............. *G06F 1/12* (2013.01); *G06F 1/163* (2013.01); *G06F 3/011* (2013.01); *G06F 3/014* (2013.01); *G06F 3/017* (2013.01)

(58) Field of Classification Search
CPC . G06F 1/12; G06F 1/163; G06F 3/011; G06F 3/014; G06F 3/017
See application file for complete search history.

(56) References Cited

U.S. PATENT DOCUMENTS

| | | | |
|---|---|---|---|
| 8,421,448 B1 * | 4/2013 | Tran | G06F 3/014 324/207.2 |
| 8,421,488 B1 | 4/2013 | Tran et al. | |
| 10,802,586 B1 | 10/2020 | Zhao | |
| 2004/0012559 A1 | 1/2004 | Seki et al. | |
| 2016/0246370 A1 | 8/2016 | Osman | |
| 2017/0090568 A1 | 3/2017 | Chen et al. | |
| 2017/0307891 A1 | 10/2017 | Bucknor et al. | |
| 2018/0253151 A1 * | 9/2018 | Kletsov | A61B 5/004 |
| 2019/0146583 A1 | 5/2019 | Seth | |
| 2020/0051271 A1 * | 2/2020 | Wexler | G06V 40/28 |
| 2020/0272235 A1 | 8/2020 | Ng | |
| 2023/0111166 A1 * | 4/2023 | Habib | G01N 3/40 73/78 |

FOREIGN PATENT DOCUMENTS

WO 2017/048068 A1 3/2017

* cited by examiner

*Primary Examiner* — Terrell S Johnson
(74) *Attorney, Agent, or Firm* — Procopio, Cory, Hargreaves & Savitch LLP

(57) ABSTRACT

A wearable device that comprises a plurality of sensors and a single EMF source, that applies a peer to peer algorithm to synchronize the detection of the EMF by the sensors for a plurality of wearable devices.

50 Claims, 8 Drawing Sheets

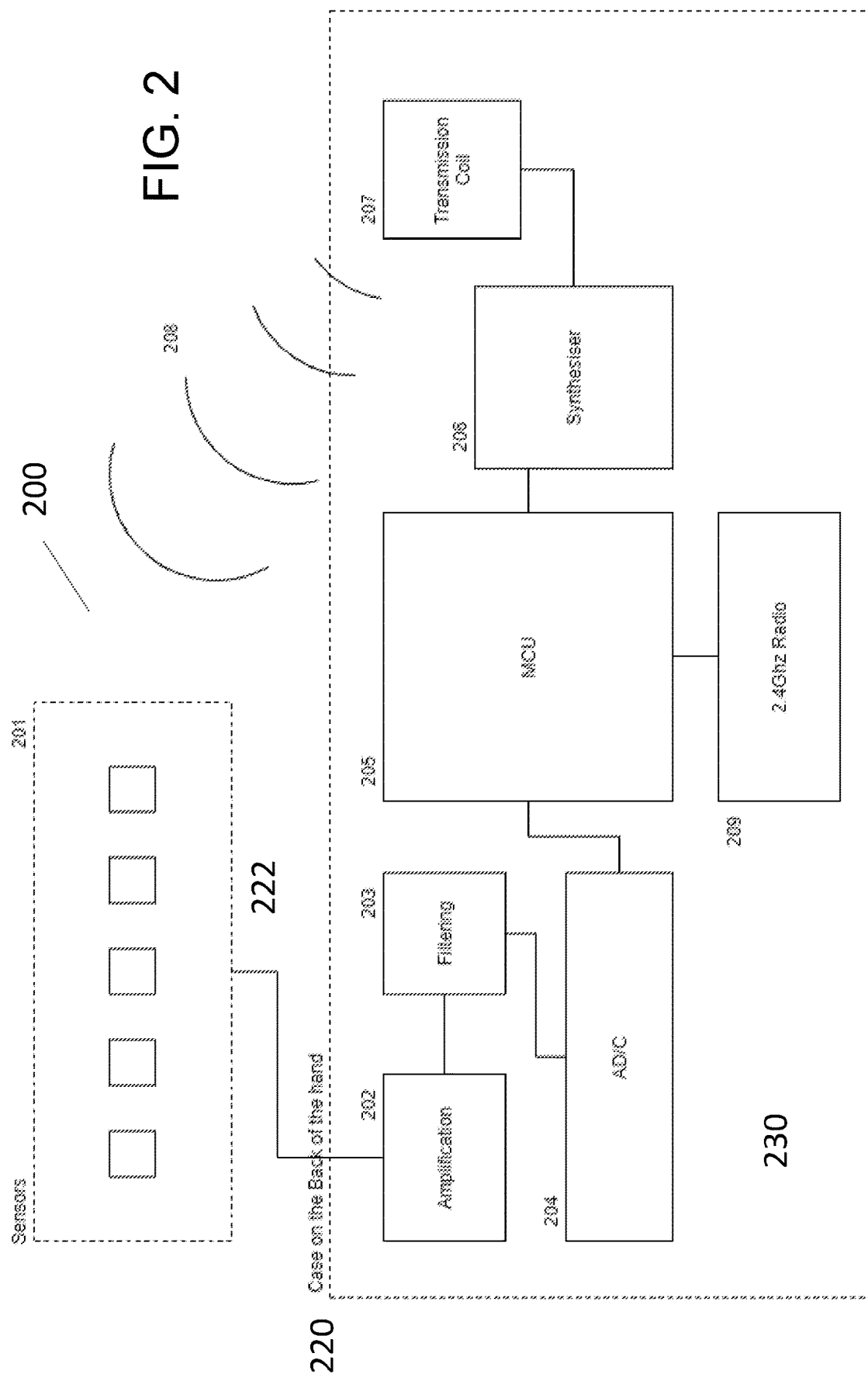

SELF-GOVERNING SYNCHRONIZATION SYSTEM AND METHOD

CROSS-REFERENCE TO RELATED APPLICATIONS

This application is US National Stage of International Patent Application PCT/IB2022/058472, filed Sep. 8, 2022, which claims benefit of priority from U.S. Provisional Application No. 63/242,502, filed Sep. 10, 2021, the contents of both of which are incorporated herein by reference.

FIELD OF THE INVENTION

The present invention relates to a system and method for self-governing synchronization of a plurality of EMF (electromagnetic field) sensors and in particular, to such a system and method for synchronizing a plurality of such systems in proximity to each other.

BACKGROUND OF THE INVENTION

EMF (electromagnetic field) sensors may be used for detecting the position of any attached object and hence may be used for tracking. For example, such sensors may be used to detect the position of humans and/or specific human appendages when attached to a human, for example when worn as an item of clothing. Determining the position of humans and/or specific human appendages may be useful, for example, for virtual reality (VR) or augmented reality (AR) devices.

US Published Application No. 20170090568 to Ke-Yu Chen et al describes such an item of clothing, which is a glove that features multiple magnetic field generators at various locations on the glove, for example at the fingertips, and a single magnetic flux density sensor or magnetic field strength sensor at a predetermined position relative to the glove, for example at the wrist. As described, each magnetic field generator includes one or more electromagnets that can be independently driven to result in the creation of a three dimensional magnetic field with known wave-like characteristics and geometry. Furthermore, the magnetic fields generated by each of the electromagnets can be distinguished from magnetic fields generated by other electromagnets by controlling one or more of the wave-like characteristics of the field. For example, each electromagnet can be driven at a different frequency (e.g., frequency division multiplexing) for disambiguation from other electromagnets. Alternatively, each electromagnet can be driven at a different instance in time (e.g., time division multiplexing) for disambiguation from (and linteroperability with) other electromagnets or undesired interference in the form of ambient or external magnetic flux. However, this application requires centralized control and synchronization of the signals to avoid interference.

BRIEF SUMMARY OF THE INVENTION

The present invention overcomes the drawbacks of the background art, by providing a wearable device that comprises a plurality of sensors and a single EMF source, that applies a peer to peer algorithm to synchronize the detection of the EMF by the sensors for a plurality of wearable devices. Without wishing to be limited by a closed list, such a device overcomes the drawbacks of the background art, which rely for example on frequency division multiplexing or time division multiplexing, and hence which require centralized control.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis. Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions. The processor is configured to execute a predefined set of operations in response to receiving a corresponding instruction selected from a predefined native instruction set of codes.

Software (e.g., an application, computer instructions) which is configured to perform (or cause to be performed) certain functionality may also be referred to as a "module" for performing that functionality, and also may be referred to as a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions-which can be a set of instructions, an application, software-which are operable on a computational device (e.g., a processor) to cause the computational device to conduct and/or achieve one or more specific functionality. Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 2 is a non-limiting, exemplary schematic diagram of the electronics and sensors used in the glove of FIG. 1A;

DESCRIPTION OF AT LEAST SOME EMBODIMENTS

Magnetic fields may be used to track human appendages as noted above. Without wishing to be limited in any way, the present invention may be used to track the position of arms, legs, head, torso, hands, feet joints and/or individual fingers. Sensors for such magnetic fields are attached to each such appendage that is to be separately tracked. For example, the sensors may be attached to an item of clothing that is worn by the user on the appropriate appendage. It is desirable to be able to track such appendages for more than one user at the same or similar time. for example, two or more users may have such sensors attached to items of clothing, and may then come into physical proximity. Differentiating between the systems that are attached to the different users is important for correct tracking of each such appendage.

Figure 1A:
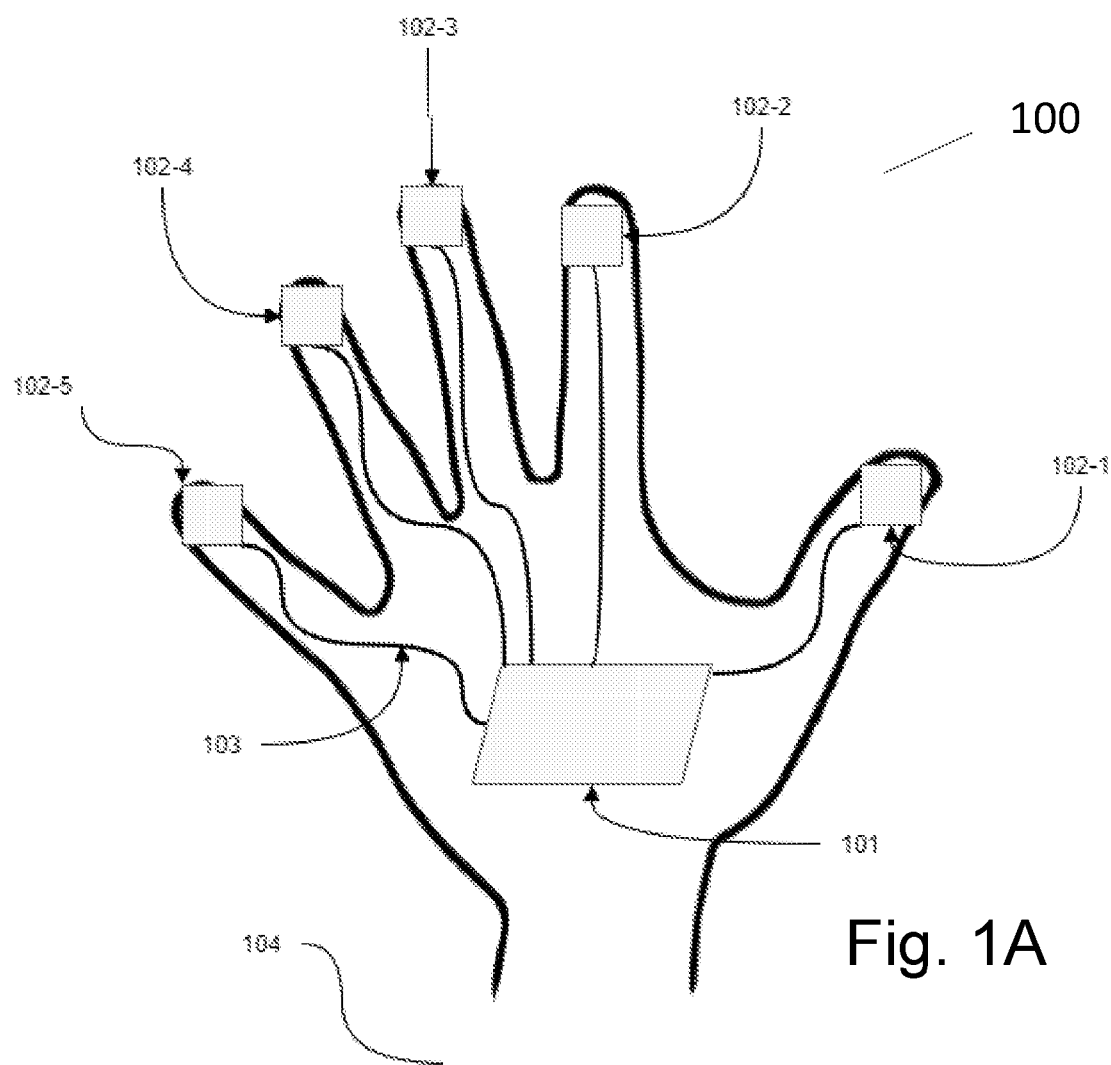
FIG. 1A shows a non-limiting, exemplary schematic of a glove that is to be worn by a user, for tracking the positions of the fingers.
Figure 1B:
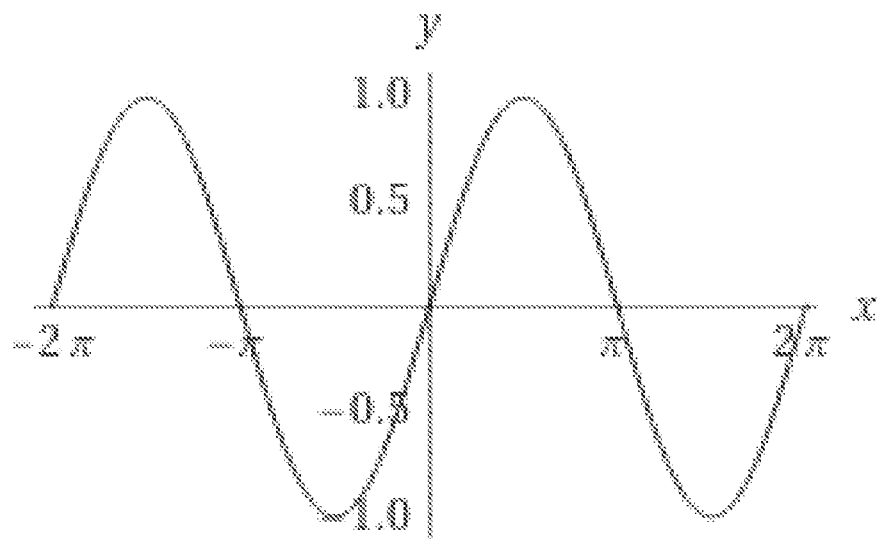
FIGS. 1B-1D are diagrams of different EMF amplitudes.
Figure 1C:
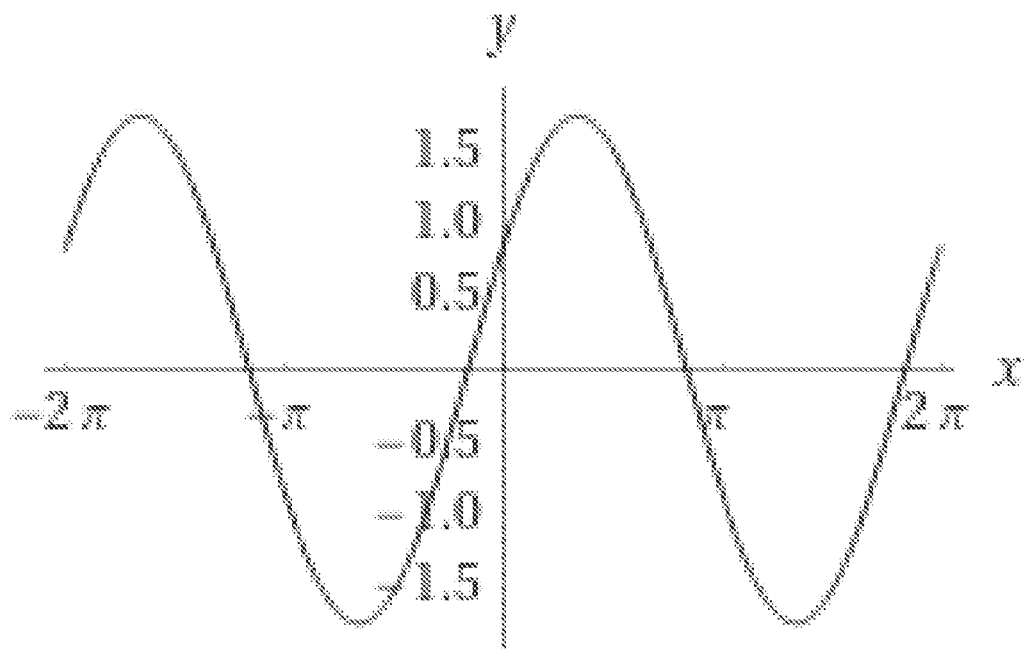
Figure 1D:
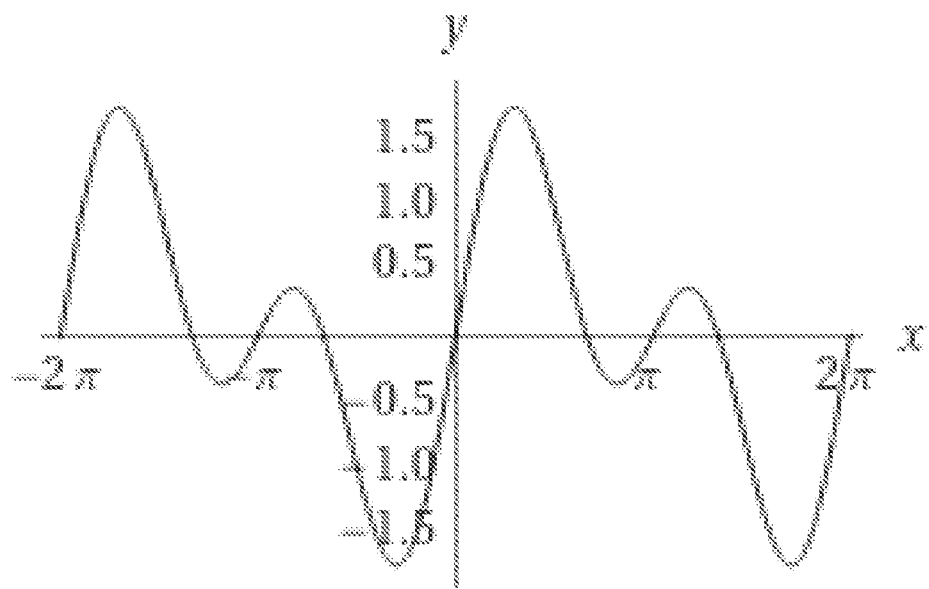

FIG. 1A shows a non-limiting, exemplary schematic of a glove that is to be worn by a user, for tracking the positions of the fingers. A glove 100 is worn on a hand 104 of the user. Glove 100 preferably features a single EMF source 101, which may be placed at the palm or wrist of glove 100 as shown. A plurality of fingers are tracked with a plurality of sensors 102, for sensing the EMF generated by EMF source 101. In this non-limiting implementation, each finger of glove 100 features a sensor 102, shown as a sensor 102-1 on the thumb, and as sensors 102-2 to 102-5 on the other fingers. A plurality of wires 103 optionally connect sensors 102 to EMF source 101, to connect analog signals from sensors 102 to EMF source 101. As described below in greater detail, EMF source 101 also comprises a processor and memory for storing instructions, for analyzing the incoming signals from sensors 102. Alternatively, a wireless communication unit may provide a data communication channel from sensors 102 to EMF source 101.

Glove 100 may comprise any suitable fabric or material for placing each sensor 102 in a desired position on a finger or thumb of the user. For example and without limitation, each sensor 102 may be placed closer to a tip of the finger or thumb of the user as shown. Glove 100 may comprise continuous fabric or material, or may have such fabric or material at a plurality of locations, but not necessarily covering the entire hand. For example, fabric may encircle a location on each finger or thumb where sensor 102 is to be placed, and may further comprise straps or other connecting material between sensors 102 and source 101. A wristband or other material may support source 101 in a desired location, such as on or near the palm or wrist of the user, or on the back of the hand of the user. Source 101 may be contained within a case (not shown; see FIG. 2).

Sensors 102 may comprise a magnetic flux density sensor or magnetic field strength sensor, three Hall effect sensors or any other suitable magnetic sensor or combination thereof Such sensors preferably operate at a frequency of at least six times the sample frequency, more preferably at least eight times and most preferably at least 10 times. Each such sensor may comprise a magnetometer which is able to detect EMF from source 101, but preferably comprises a sensor that is at least able to determine an amplitude of the EMF at the appropriate speeds.

As shown, preferably the location of each finger is tracked with a separate sensor 102, while the location of all sensors 102, and hence all fingers on one hand, is preferably tracked with one EMF source 101. However, as shown with regard to FIG. 3, different gloves 100 each use a separate source 101 to track their corresponding sensors 102 and hence their corresponding fingers. Each such EMF source 101 creates an alternating magnetic field, which is preferably emitted periodically for a short period of time. The duration of this period of time is preferably determined according to the frequency of the sine wave that is sent out.

A problem may arise however when each source 101 for multiple gloves 100 emits a magnetic field at, or almost at, the same time, particularly when such gloves are in close proximity. Such close proximity may occur for example between two gloves 100 for one user, or between gloves 100 for different users. This causes interference in the measured signal and when converting to an amplitude creates wrong values. These amplitudes are used to calculate the position and orientation, so this conversion will now also produce incorrect results.

Using only a single sine wave this will for example give an amplitude from −1 to 1 (FIG. IB). However adding a second sine wave with the same frequency will give a totally different amplitude (FIG. IC). Therefore the proximity of multiple EMF sources 101, for example when a plurality of gloves 100 are in proximity, would create significant and variable difficulties for correct detection of the EMF by sensors 102.

Some background art devices attempt to solve this problem with a plurality of different EMF sources with different frequencies and only one sensor, such that the single sensor detects and tracks each source according to the different frequencies. However this approach also has its downsides. The different frequencies still stack on top of each other and because the measured amplitude and phase are unknown, separating them is a difficult task. For example, when in proximity, the presence of different frequencies together may cause the signal to be stronger or weaker than for a single frequency (FIG. ID). This signal strength variability causes problems with the amplification and hence the detection of the signal. Therefore the easiest method to detect the signals correctly is by somehow only sending out one signal at a time; yet limiting the signal presence by time, according to the background art, requires centralized control.

For example, the background art describes a master and slave configuration for controlling transmission of the EMF and hence detection of the signal. However this configuration requires communication between the gloves and a computational device that determines the location of the gloves and hence of the fingers/thumb of the user. Such communication causes delays and increases the need for data transmission bandwidth Without wishing to be limited by a closed list, among the advantages of the present invention is that it is able to detect the presence of a signal in a time delimited manner without requiring a centralized control. EMF source 101 emits EMF intermittently and sensors 102 detect EMF intermittently. The timing for emitting EMF for EMF source 101 is determined according to a clock (see FIG. 3). As described in greater detail below, the clocks for EMF sources 101 for a plurality of gloves 100 are not absolutely synchronized, since each such clock is expected to exhibit slightly different timing. Such slightly different timing in turn informs the computational device that is tracking each such glove 100 as to whether the EMF relates to the glove 100 being tracked or a different glove. Thus, such slight different timings lead detection of EMF for gloves 100 to become self synchronized.

FIG. 2 is a non-limiting, exemplary schematic diagram of the electronics and sensors used in the glove of FIG. 1A. As shown, a system 200 comprises a plurality of sensors 201, which are preferably located at the fingers and thumb of the user as previously described with regard to FIG. 1A. Sensors 201 may comprise the types of sensors described with regard to FIG. 1A, for example. A case 220 may be attached to the wrist or hand of the user, for example at the palm or back of the hand. Case 220 contains a plurality of components as shown, including without limitation a transmission coil 207 which emits EMF 208 as shown, for detection by sensors 201.

An amplification unit 202 receives signals from sensors 201 through a plurality of wires 222, of which one is shown for simplification. Amplification unit 202 then amplifies the received signal and passes the amplified signal to a filtering unit 203. Filtering unit 203 may comprise one or more cut-off filters and/or notch filters, to reduce noise and to boost the desired signal frequency. The signal is then passed to an ADC (analog-to-digital converter) 204, to digitize the analog signals for further processing. The digitized signals may then by analyzed by a MCU (microcontroller unit) 205, which comprises a processor unit, a memory, communication interfaces and peripherals (not shown).

MCU 205 also determines when EMF signals 208 are to be emitted by transmission coil 207. Such signals 208 are emitted intermittently, with a periodicity and duration of transmission that is determined according to instructions stored in the memory and executed by the processor.
The signals are generated by a synthesizer 206 and then passed to transmitter 207.

Analyzed data may be transmitted by a radio 209, which in this non-limiting example comprises a 2.4 GHz radio.

To determine when EMF signals 208 are to be emitted, MCU 205 features a clock (not shown) for timing this activity and other activities. Such clocks typically have an expected accuracy, which determines the precision of the timing. The clock may for example comprise an internal oscillator, such as an internal RC oscillator, featuring a linear oscillator circuit which uses an RC network, a combination of resistors and capacitors. Alternatively, the clock may preferably comprise a crystal clock. The precision of the clock may be defined in terms of tolerance, which is the extent (by time) to which the clock signal timing differs from the expected timing. The greater the tolerance, the lower the precision of the clock and hence the greater possible variability in timings between different clocks, such as those located at different gloves. This variability in turn means that EMF signals 208 will be emitted at different times for MCUs 205 located on different gloves.

Figure 4:
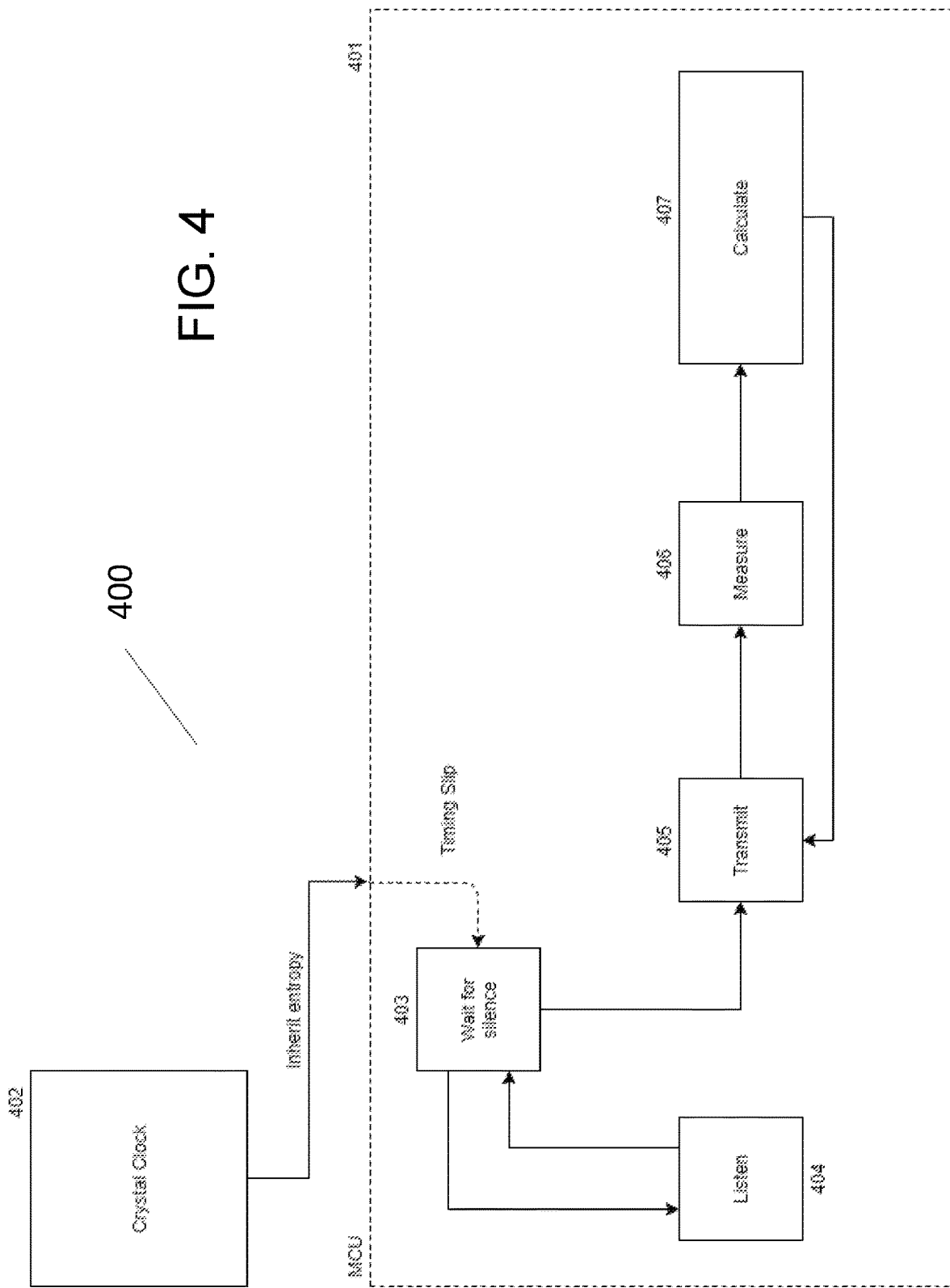
FIG. 4 shows an exemplary, non-limiting state logic diagram.

MCU 205 therefore preferably relies on a process shown as an example in greater detail with regard to FIG. 4. Briefly, the process preferably comprises four different stages. The first stage comprises measuring EMF signals 208 by sensors 201. The second stage comprises sending EMF signals 208 and then measuring the return signal by sensors 201. The third stage comprises a plurality of calculations, to determine the positions of sensors 201. The fourth and last stage is data transmission, in which data related to these positions is transmitted for example to a user computational device. MCU 205 therefore preferably causes transmission coil 207 to send out signals 208 during the second stage only. Otherwise, during the other stages, MCU 205 preferably causes system 200 to cease sending out signals 208.

Signals 208 from a specific system 200 are received by the corresponding sensors 201 of that system 200, such that signals 208 are received by the corresponding glove. However if another glove is close enough, sensors 201 can also measure these signals 208 from that other glove. The first stage enable synchronization to occur. Because no signals are being transmitted by transmission coil 207, if any signal is measured by sensors 201, that signal 208 would be coming from another glove. If the system 200 of the glove has measured no signal 208, MCU 205 can now continue to the next stage of the cycle. Otherwise, MCU 205 waits before continuing to the next stage.

Without wishing to be limited by a closed list, this method is fully self-governed and is expected to require a single cycle to synchronize. The method also works continuously, so if a glove comes too close to another glove, MCU 205 is able to automatically synchronize with the glove(s) at the same time.

Functions of the processor of MCU 205 (or of another, equivalent computational unit within system 200) preferably relate to those performed by any suitable computational processor, which generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as the memory of MCU 205 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, the memory is configured for storing a defined native instruction set of codes. The processor is configured to perform a defined set of basic operations in response to receiving a corresponding basic instruction selected from the defined native instruction set of codes stored in the memory. For example and without limitation, the memory may store a first set of machine codes selected from the native instruction set for performing the first stage of listening for (measuring) signals 208. If such signals are detected, they are known to come from a different system 200 and so a second set of machine codes selected from the native instruction set operates to wait before the second stage is performed. The memory may store a third set of machine codes selected from the native instruction set for performing the second stage of both transmitting and measuring signals 208. The memory may store a fourth set of machine codes selected from the native instruction set for performing the third stage of calculating the location of each sensor 201 based upon the measured signals. The memory may store a fifth set of machine codes selected from the native instruction set for performing the fourth stage of transmitting data based upon the calculated location(s).

The electronic components contained within case 220 may for example be termed a base 230. Base 230 preferably comprises the necessary components to be able to generate EMF signals, and hence to comprise an EMF source; to receive signals from the plurality of sensors 201; and to transmit analyzed data, such as for example location data, through a transmitter such as radio 209.

Figure 3:
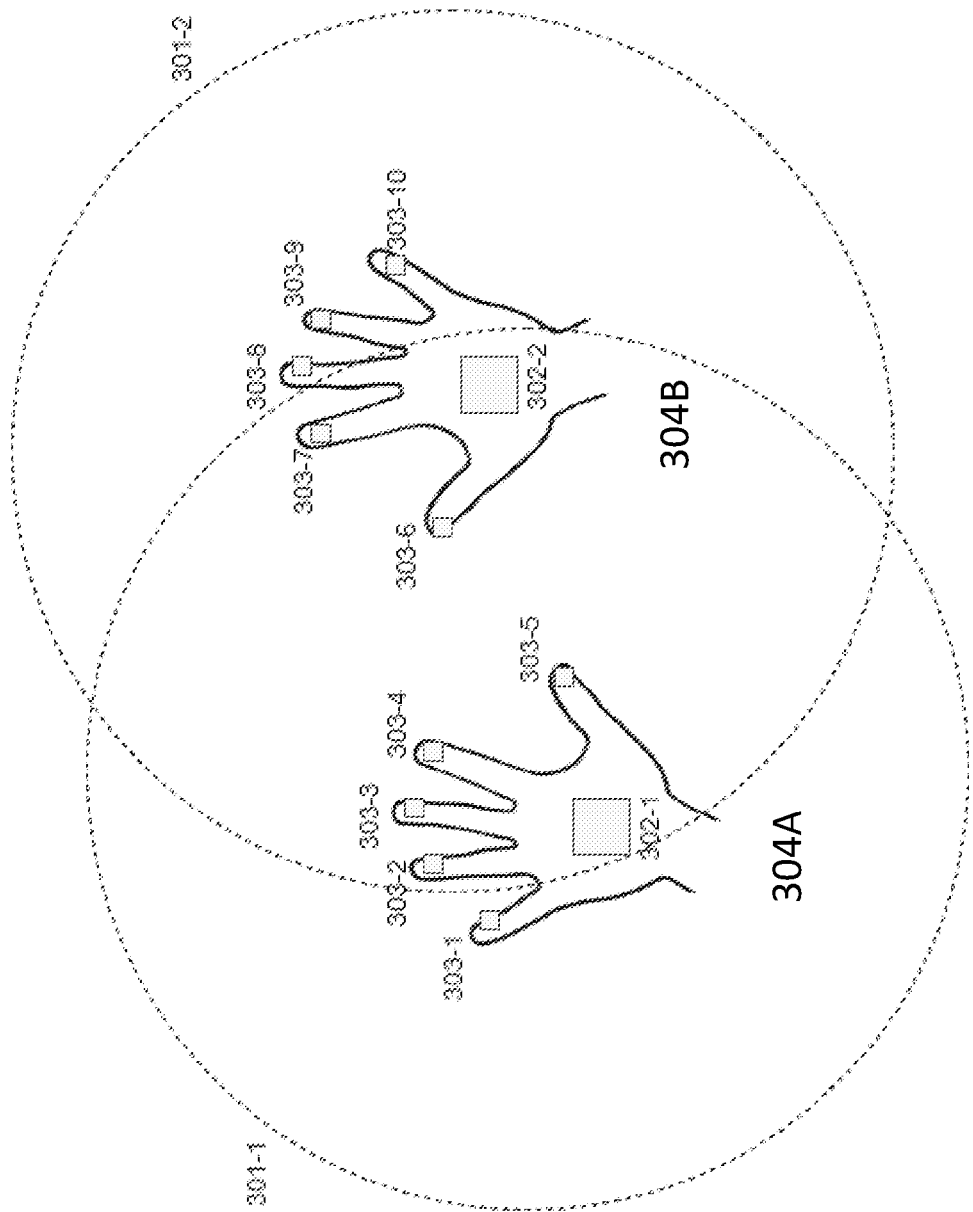
FIG. 3 is a schematic illustrative diagram of multiple systems of FIG. 1A in proximity to each other.

FIG. 3 is a schematic illustrative diagram of multiple systems of FIG. 1A in proximity to each other. As shown, a glove 304A and a glove 304B are in sufficiently close proximity that signals from one glove, such as 304A, may be measured by the other glove, such as 304B. The range of signal detection for glove 304A is shown with regard to the circle 301-1, and the range of signal detection for glove 304B is shown with regard to the circle 301-2. The overlap between circles 301-1 and 301-2 indicates the extent to which signals from glove 304A may be measured by sensors 303-6 to 303-10 on glove 304B and vice versa. Gloves 304A and 304B may be from different users or from different hands of the same user.

FIG. 4 shows an exemplary, non-limiting state logic diagram. A system 400 features an MCU 401, which may be configured as previously described, and a crystal clock 402 which is optionally and preferably external to MCU 401. MCU 401 listens for signals from crystal clock 402. The operation of crystal clock 402 has inherent entropy. Increasing the accuracy of crystal clock 402 also increases its entropy (https://journals.aps.or2/nrx/abstract/10 1103/PhysllevX. 1 1 021029). Crystal clock 402 therefore has a certain accuracy, such that the timing signals are produced with regard to a certain tolerance in regard to that accuracy. The timing signals need to have enough accuracy for MCU 401 to be operative. However, as previously noted, the tolerance of the timing signals, or the extent to which timing slip occurs, also enables multiple gloves to synchronize their signal emission and measurement stages through a peer to peer process, to avoid cross-talk and problems with signal overlap.

At 403, MCU 401 waits for silence, by measuring signals at 404. If any signals are detected, since the system 400 isn't transmitting, then these signals come from another glove. The process preferably cycles between 403 and 404, until no signals are detected (or at least no signals above a certain threshold strength). Once no or only low signals are detected, then at 405, MCU 401 causes EMF signals to be transmitted. At 406, these signals are measured and at 407, calculations are performed. The process may then return to 405 until MCU 401 causes transmissions to stop, at which point the device returns to 403.

Figure 5:
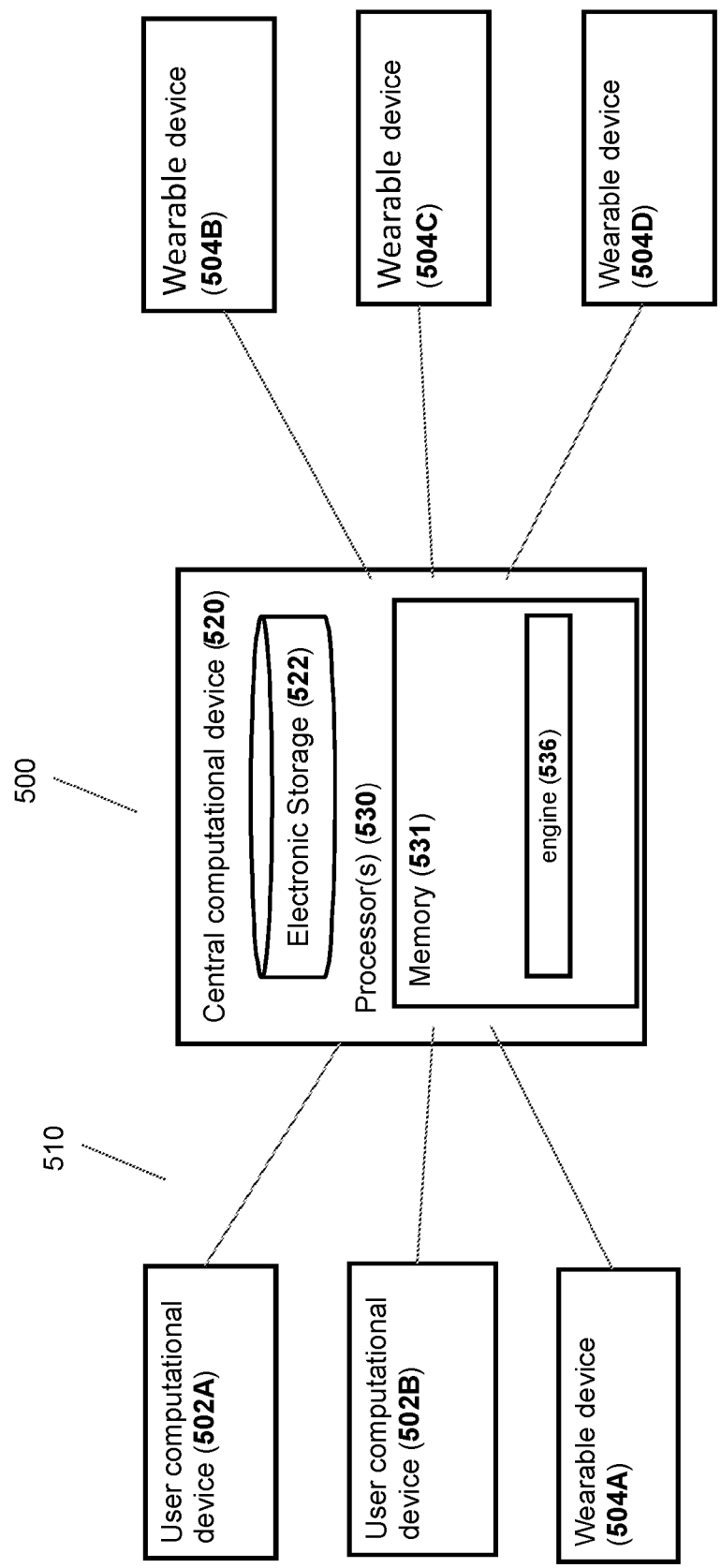
FIG. 5 shows an exemplary, non-limiting system incorporating a plurality of wearable devices as described herein.

FIG. 5 shows an exemplary, non-limiting system incorporating a plurality of wearable devices as described herein. As shown, a system 500 features a plurality of wearable devices 504, of which four are shown herein as wearable devices 504A-504D for the purpose of illustration and without any intention of being limiting. Wearable devices 504 may comprise devices as described herein, such as the gloves described herein and/or a headset. System 500 also optionally and preferably features a central computational device 520, which is in contact with wearable devices 504 through a computer network 510. Network 510 may comprise any suitable wired or wireless communication network, including without limitation WiFi, Bluetooth, radio frequencies and cellular network communication.

Central computational device 520 preferably comprises a processor 530 and a memory 531. Memory 531 stores a plurality of instructions for execution by processor 530 to fulfill the functions of central computational device 520, for example and without limitation to provide an engine 536. For example and without limitation, engine 536 may support game play for an interactive electronic game. A plurality of users may wear wearable devices 504, and may interact with the game according to game play supported by engine 536. The relative location of the users may be determined through wearable devices 504; such a relative location may affect game play. The location may be provided to central computational device 520 by wearable devices 504. In turn, central computational device 520 may send information and/or instructions, and/or may fulfill such functions as keeping score, according to the provided location.

Central computational device 520 may also comprise an electronic storage 522, for example for storing user profile information, additional game data and/or other information for supporting the functions of central computational device 520 and/or of system 500 overall.

System 500 may also, additionally or alternatively, comprise a plurality of user computational devices 502, shown as user computational devices 502A and 502B for the purpose of illustration only and without any intention of being limiting. Optionally one or more user computational device(s) 502 replace central computational device 520. User computational devices 502A and 502B may be used for example to control game play, to receive information about game play and/or to participate in game play, in combination with wearable devices 504. Other optional uses include but are not limited to motion capture (for example for film and/or animation), education, training, coaching (for example for sports or other activities), simulation and so forth.

Within system 500, synchronization between wearable devices 504 occurs in a peer-to-peer manner, without centralized control by central computational device 520 and/or user computational device(s) 502.

Figure 6:
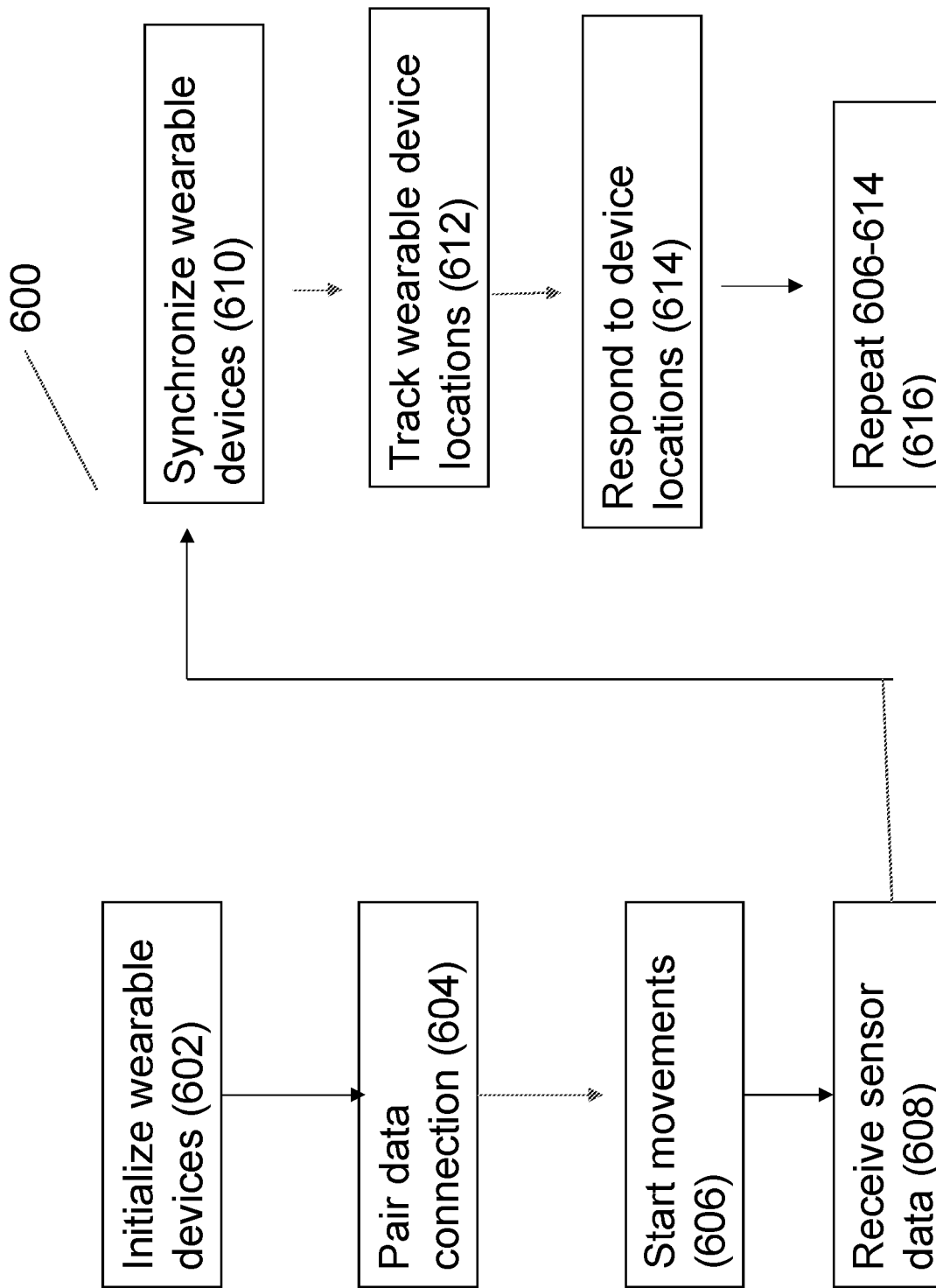
FIG. 6 shows an exemplary, non-limiting method for operating a system incorporating a plurality of wearable devices as described herein.

FIG. 6 shows an exemplary, non-limiting method for operating a system incorporating a plurality of wearable devices as described herein. As shown in a method 600, the process begins by initializing a plurality of wearable devices at 602. The wearable devices are assumed to comprise at least one, and preferably a plurality of, sensors. For example, for a wearable device comprising a glove, each of a plurality of fingers features a sensor, while the glove preferably features a single EMF source, for example at the wrist, back of the hand or palm of the hand. Such initialization may include calibration, for example. Initialization may also include functions to support initial communication between the plurality of sensors and the EMF source. The user may put on (wear) the wearable device during the initialization process or before it begins. Pairing may then occur with a data connection for each wearable device at 604. The data connection may for example feature a connection to the previously described base, which may control EMF source, and/or to a central computational device as previously described.

At 606, the user begins to move with the wearable device being worn. For example, if the wearable devices comprises a pair of gloves, then the user may move their hands and in so doing, move the gloves. A plurality of users may wear the wearable devices, in which case movement of the plurality of users moves a plurality of such wearable devices. At 608, sensor data for each wearable device is received by its respective base (as shown for example in FIG. 2) for processing.

At 610, the plurality of wearable devices are synchronized as described herein, by first listening for an EMF signal; then, when such a signal is no longer being received, generating its own EMF signal; and then processing received sensor data.

At 612, the location of the various wearable devices is tracked. Such tracking preferably comprises at least determining the relative location of one or more sensors within a wearable device and/or a wearable device system. In the wearable device system, the various components may not be physically connected but may instead be connected through one or more wireless communication channels. Such tracking may also comprise determining the location of the plurality of wearable devices relative to each other.

At 614, a response is made to the location of sensors within the wearable device and/or wearable device system, and/or between wearable devices, for example for game play and/or other activities as previously described. Optionally responses may occur in regard to location or movement of props or other objects with trackable locations and/or movements. At 616, stages 606-614 may be repeated at least once and preferably a plurality of times.

Figure 7:
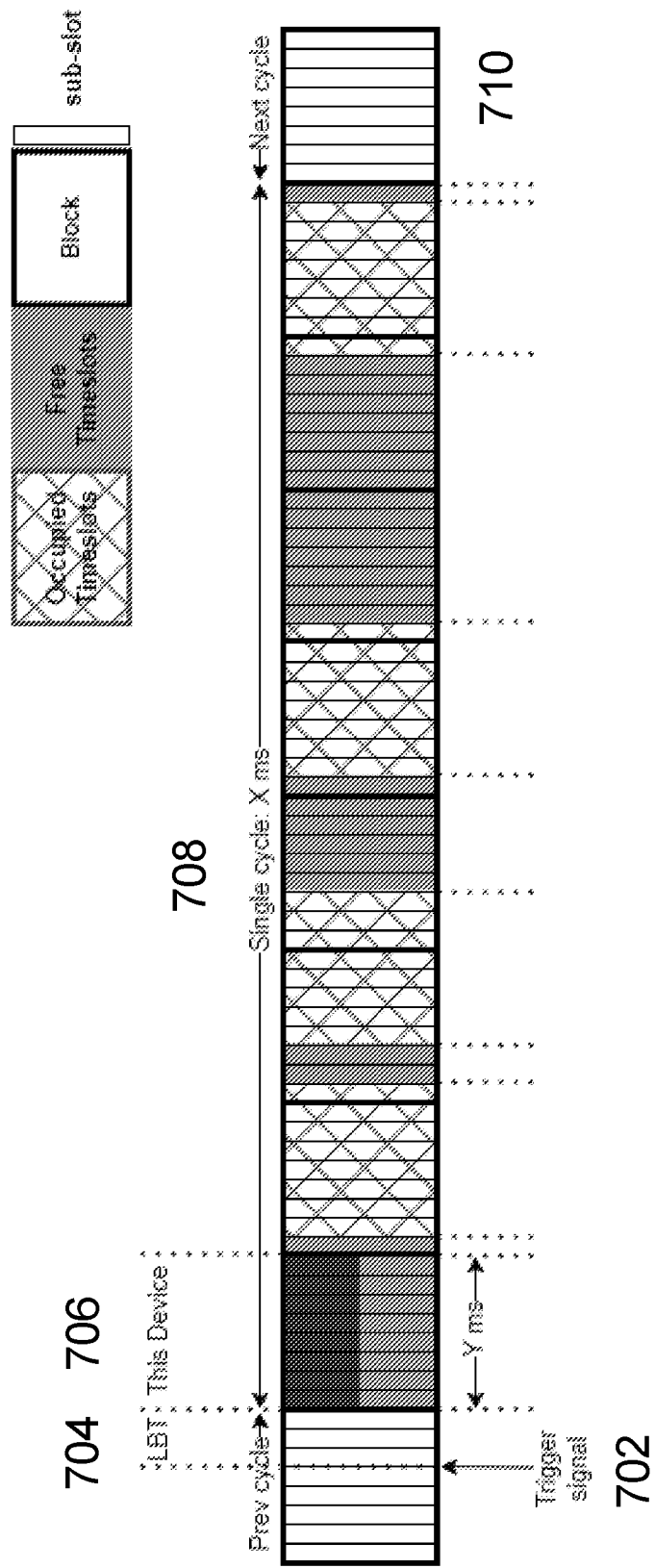
FIG. 7 shows an exemplary, non-limiting scanning and transmission cycle according to at least some embodiments.

FIG. 7 shows an exemplary, non-limiting scanning and transmission cycle according to at least some embodiments. As shown, a cycle 700 preferably features a trigger signal 702 at the end of a previous cycle. Trigger signal 702 then causes a wearable device as described herein, or at least an EMF sensor within a device as described herein, to start to listen for a transmission. The listening period is indicated as LBT 704. LBT stands for "listen before transmission". If such a device as described herein receives a transmission, then the device (or at least the EMF sensor therein) waits for a period of time 706 before starting its listening and transmission cycle. Time period 706 illustrates the time (or amount of slots) the device needs to have in order to function. The length of the period of time 706 is preferably predetermined according to software at the device level, and is also preferably equal for all devices transmitting to each other within a particular system. The provision of period of time 706 prevents overlapping transmission between a plurality of devices within a system.

A single listening and transmission cycle is indicated with 708. During cycle 708, the various time periods are indicated as described with regard to a key 712. The dark border for each timeslot indicates the length of the timeslot (block). As shown, occupied timeslots (during which the device is not able to transmit) are indicated with cross-hatching, indicating that another device is transmitting during this block. Block boundaries for transmission by other devices may not completely correspond to those boundaries being observed by a particular device. However over time, these boundaries are expected to converge as the devices in a group of peer devices align their relative transmission times, such that eventually the plurality of devices may be expected to observe the same or similar block boundaries.

Unoccupied or "free" timeslots (during which the device may transmit) are indicated with gray shading. Each device in a group of peer devices broadcasts once during cycle 708. Each device transmits during an unoccupied timeslot. The frame rate partially determines the number of devices that are able to transmit during each cycle, such that twice as many devices are able to transmit at a frame rate of 60 Hz than at 120 Hz. The faster frame rate (refresh rate) would increase the density of information but would reduce the number of devices transmitting during a cycle. The length of transmission time (y milliseconds in FIG. 7) also partially determines the number of devices that are able to transmit during each cycle.

The next cycle then begins at 710. Each device in a peer to peer system, as described herein, is preferably able to fully scan an entire slot cycle 708, which enables potential conflicts to be detected even for a transmission slot which a device may be occupying. For example, each device in a peer to peer system may wait to transmit and may instead scan during entire slot cycle 708, optionally at random times or alternatively as predetermined by the software. Such an additional scan prevents simultaneous overlaps. Such overlaps may be expected to be corrected by clock drift over time; however, proactively scanning reduces the amount of time before such correction occurs and is also expected to reduce the number of potential tries needed to transmit on an empty slot because each device now has an accurate mapping of the entire cycle.

The additional scan may be performed at any arbitrary point. However, the greater the number of devices performing such a scan and/or the greater the frequency of scanning, the less up to date the sensor position information is expected to be. The process of scanning effectively removes a frame of data. Without wishing to be limited by a single hypothesis, the data may be expected to remain accurate but is not as frequently updated. The frequency of this scan for an individual peer to peer system of devices may be expected to be correlated to how frequently the data is updated. The number of devices in a peer to peer system that perform this scanning process is not expected to influence the ability of each device to read back its sensor positions, as the devices performing the "read" cycle are not adding to the EMF noise, but are only listening. Such less frequently updated sensor position information in turn leads to less frequently updated device position information, for example with regard to relative device position. Preferably a balance between additional scans and data measurements is determined, according to the needs of the system of peer to peer devices.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A wearable device system, comprising a plurality of sensors for transmitting sensor signals and a base, wherein said base comprises a single EMF source for transmitting EMF signals for receipt by said plurality of sensors, a sensor signal receiver for receiving said sensor signals, and a controller for controlling generation of said EMF source and processing of sensor signals from said sensor signal receiver; wherein said controller comprises a plurality of instructions and a processor to execute said instructions, wherein execution of said instructions causes said controller to:
   listen for a signal from said sensor signal receiver while said EMF source is not transmitting;
   if no signal is received, activate said EMF source to generate EMF signals;
   listen for said signal from said sensor signal receiver while said EMF source is transmitting; and
   analyze said received signal to determine a location of each sensor.

2. The wearable device system of claim 1, wherein said plurality of sensors comprise a magnetic flux density sensor or magnetic field strength sensor, three Hall effect sensors or any other suitable magnetic sensor or combination thereof.

3. The wearable device system of claim 2, wherein said sensors operate at a frequency of at least six times the sample frequency.

4. The wearable device system of claim 3, wherein said frequency is at least eight times the sample frequency.

5. The wearable device system of claim 4, wherein said frequency is at least 10 times the sample frequency.

6. The wearable device system of claim 1, wherein each sensor comprises a magnetometer which is able to detect said EMF signals.

7. The wearable device system of claim 1, wherein each sensor comprises a sensor that is at least able to determine an amplitude of the EMF at the appropriate sample speed.

8. The wearable device system of claim 1, wherein said base and said plurality of sensors are not physically attached.

9. The wearable device system of claim 1, formed as a single wearable device.

10. The wearable device system of claim 9, wherein said single wearable device comprises fabric or material for supporting said single wearable device for being worn by a subject.

11. The wearable device of claim 9, wherein said wearable device comprises a glove, comprising a plurality of fingers and a case; wherein said plurality of sensors are mounted at said plurality of fingers of said glove; and wherein said case is mounted at a back of said glove, a wrist of said glove or a palm of said glove; wherein said base is contained within said case.

12. The wearable device system of claim 10, wherein each of said plurality of sensors is mounted at each of said plurality of fingers, wherein a wire connects each of said plurality of sensors to said EMF source.

13. The wearable device of claim 11, wherein said glove comprises fabric or material in an amount selected from the group consisting of continuous fabric or material, or fabric or material present at a plurality of locations, but not necessarily covering the entire hand.

14. The wearable device of claim 13, wherein said fabric encircles a location on each finger or thumb where a sensor is located, and straps or other connecting material between said sensors and said case.

15. The wearable device of claim 13, further comprising a wristband for supporting said case on or near the palm or wrist of the user, or on the back of the hand of the user.

16. The wearable device of claim 1, wherein said EMF source is a single EMF source.

17. The wearable device of claim 1, wherein said EMF source emits EMF intermittently and said sensors detect EMF intermittently, and wherein said timing of emitting EMF and detecting EMF is determined according to a clock.

18. The wearable device of claim 17, wherein said clock is selected from the group consisting of an internal oscillator and a crystal clock.

19. The wearable device of claim 1, wherein said controller comprises a memory for storing said instructions.

20. The wearable device of claim 1, wherein said controller comprises a clock for determining timing of transmission of EMF and receiving EFM.

21. The wearable device of claim 1, wherein said EMF source further comprises a transmission coil for transmitting EMF.

22. The wearable device of claim 21, wherein said EMF source further comprises a synthesizer for synthesizing EMF.

23. The wearable device of claim 21, wherein said controller determines when said transmission coil transmits said EMF.

24. The wearable device of claim 1, wherein said controller is implemented as a chip.

25. The wearable device of claim 24, wherein said controller is implemented as an MCU.

26. The wearable device of claim 1, wherein said base further comprises an amplification unit for amplifying received signals from said sensors.

27. The wearable device of claim 26, wherein said base further comprises a filtering unit for receiving said amplified signals from said amplification unit and for filtering said amplified signals to reduce noise.

28. The wearable device of claim 27, wherein said filtering unit comprises one or more cut off filters and/or notch filters.

29. The wearable device of claim 27, wherein said base further comprises an ADC (analog-to-digital converter), to digitize analog signals from said filtering unit for further processing by said controller.

30. The wearable device of claim 1, wherein said instructions stored at said memory of said controller are executed by said processor of said controller to analyze EMF signals received by sensors; cause said transmission coil to transmit EMF signals;
measure a return signal according to EMF signals received by said sensors; and
perform a plurality of calculations, to determine positions of said sensors.

31. The wearable device of claim 30, wherein said positions of said sensors are determined as relative positions to each other.

32. The wearable device of claim 30, wherein said instructions stored at said memory of said controller are executed by said processor of said controller to analyze said EMF signals received by said sensors as a first stage; to cause said transmission coil to transmit said EMF signals as a second stage; to measure said return signal as a third stage; and to perform said plurality of calculations as a fourth stage; wherein said transmission coil is only permitted to transmit at said second stage.

33. The wearable device of claim 32, wherein before said second stage a listening stage is performed, such that said second stage starts only after a period of not receiving EMF signals.

34. The wearable device of claim 1, wherein said instructions stored at said memory of said controller are executed by said processor of said controller to perform EMF transmitting and receiving according to a cycle; wherein said cycle begins upon receiving a trigger signal; wherein upon receiving said trigger signal, said instructions stored at said memory of said controller are executed by said processor of said controller to listen for a period of time; and to cause said EMF source to transmit EMF when EMF is not being received after said period of time of listening.

35. The wearable device of claim 34, wherein said period of time of listening is repeated a plurality of times during said cycle.

36. The wearable device of claim 35, wherein said EMF source transmits once during said cycle.

37. The wearable device of claim 1, wherein said instructions stored at said memory of said controller are executed by said processor of said controller to perform EMF transmitting and receiving according to a cycle; wherein said cycle begins when said instructions stored at said memory of said controller are executed by said processor of said controller to listen for a period of time; and to cause said EMF source to transmit EMF when EMF is not being received after said period of time of listening.

38. An interactive system, comprising a plurality of wearable devices according to claim 1, wherein as said plurality of wearable devices enter into physical proximity, passive self-synchronization occurs between said plurality of wearable devices, without reference to an external synchronization device.

39. The interactive system of claim 38, wherein each clock at each wearable device controls timing of transmitting and receiving EMF, and each clock has a different synchronization.

40. The interactive system of claim 39, wherein said different synchronization of each clock occurs due to clock timing drift.

41. The interactive system of claim 38, further comprising a central computational device in communication with said plurality of wearable devices for determining a relative location of said plurality of wearable devices, wherein said central computational device does not participate in said passive self-synchronization.

42. The interactive system of claim 41, wherein said central computational device further comprises a memory for storing a plurality of instructions and a processor for executing said instructions, wherein said instructions are executed for at least determining said relative location of said plurality of wearable devices.

43. The interactive system of claim 42, wherein said instructions are not executed for participation by said central computational device in said passive self-synchronization.

44. The interactive system of claim 41, wherein each wearable device further comprises a radio for transmitting data to said central computational device.

45. The interactive system of claim 44, wherein each wearable device only transmits data related to analyzed signals from said sensors.

46. The interactive system of claim 44, wherein for each wearable device, said instructions stored at said memory of said controller are executed by said processor of said controller to analyze EMF signals received by sensors; cause said transmission coil transmit EMF signals; measure a return signal according to EMF signals received by said sensors; perform a plurality of calculations, to determine positions of said sensors; and
transmit information regarding said positions to said central computational device through said radio.

47. The interactive system of claim 46, wherein said positions of said sensors are determined as relative positions to each other.

48. The interactive system of claim 38, wherein for each wearable device, wherein said instructions stored at said memory of said controller are executed by said processor of said controller to perform EMF transmitting and receiving according to a cycle; wherein said cycle begins for each wearable device when said instructions stored at said memory of said controller are executed by said processor of said controller to listen for a period of time; and to cause said EMF source to transmit EMF when EMF is 20not being received after said period of time of listening; wherein said cycle comprises a plurality of timeslots, such that when said plurality of wearable devices are initialized, at least some of said timeslots for each device in each cycle have different boundaries.

49. The interactive system of claim 38, further comprising at least one user computational device, for supporting game play, motion capture, education, training, coaching for a physical activity, a virtual world, or simulation, or a combination thereof.

50. The interactive system of claim 49, wherein said central computational device, said at least one user computational device, or a combination thereof, provides a response according to said positions of said sensors, to support said game play, motion capture, education, training, coaching for said physical activity, said virtual world, or simulation, or a combination thereof.

* * * * *